United States Patent
Makimura et al.

(10) Patent No.: US 8,179,057 B2
(45) Date of Patent: May 15, 2012

(54) ELECTRONIC BALLAST FOR DISCHARGE LAMP

(75) Inventors: Shinji Makimura, Kitakatsuragi-gun (JP); Hiroshi Kido, Hirakata (JP)

(73) Assignee: Panasonic Corporation, Osaka (JP)

( * ) Notice: Subject to any disclaimer, the term of this patent is extended or adjusted under 35 U.S.C. 154(b) by 265 days.

(21) Appl. No.: 12/669,538

(22) PCT Filed: Jul. 25, 2008

(86) PCT No.: PCT/JP2008/063372
§ 371 (c)(1),
(2), (4) Date: Jan. 18, 2010

(87) PCT Pub. No.: WO2009/014204
PCT Pub. Date: Jan. 29, 2009

(65) Prior Publication Data
US 2010/0194305 A1 Aug. 5, 2010

(30) Foreign Application Priority Data
Jul. 26, 2007 (JP) ................................. 2007-193984

(51) Int. Cl.
*G05F 1/00* (2006.01)

(52) U.S. Cl. ........ 315/291; 315/307; 315/224; 315/360; 315/209 R; 315/244; 315/DIG. 5

(58) Field of Classification Search .................. 315/291, 315/307, 308, 209 R, 244, 224, 246–24, 283, 315/360, 226, 194, DIG. 5, DIG. 78
See application file for complete search history.

(56) References Cited

U.S. PATENT DOCUMENTS

| 5,828,185 A * | 10/1998 | Fellows et al. | 315/246 |
| 6,326,740 B1 * | 12/2001 | Chang et al. | 315/291 |
| 6,891,339 B2 * | 5/2005 | Ribarich et al. | 315/291 |
| 7,271,552 B2 * | 9/2007 | Van Den Berg | 315/307 |
| 7,545,107 B2 * | 6/2009 | Yamamoto et al. | 315/326 |
| 2011/0018460 A1 * | 1/2011 | Samejima et al. | 315/291 |

FOREIGN PATENT DOCUMENTS

| JP | 2003-109785 A | 4/2003 |
| JP | 2003-332090 A | 11/2003 |
| JP | 2004-127656 A | 4/2004 |
| JP | 2005-135642 A | 5/2005 |

OTHER PUBLICATIONS

International Search Report for the Application No. PCT/JP2008/063372 mailed Oct. 14, 2008.

* cited by examiner

*Primary Examiner* — Haiss Philogene
(74) *Attorney, Agent, or Firm* — Cheng Law Group, PLLC

(57) ABSTRACT

An electronic ballast for a discharge lamp includes a predictive circuit and a correction circuit in addition to a power conversion circuit including an inverter circuit and a resonant circuit, a drive circuit and a frequency control circuit. The inverter circuit applies load voltage across a load circuit including the lamp via the resonant circuit. The predictive circuit predicts a resonance frequency of the combination of the resonant circuit and the load circuit after ignition of the lamp. The resonance frequency is predicted based on an input signal representing the load voltage in the period of time from the start of sweep of the inverter circuit's operating frequency through a time point immediately after ignition of the lamp. The correction circuit changes the end frequency of the sweep to the resonance frequency.

10 Claims, 12 Drawing Sheets

PRIOR ART

PRIOR ART

ELECTRONIC BALLAST FOR DISCHARGE LAMP

TECHNICAL FIELD

The invention relates generally to electronic ballasts and more particularly to an electronic ballast for a discharge lamp, configured to sweep the operation frequency of an inverter circuit from a start frequency to an end frequency to increase load voltage.

BACKGROUND ART

FIG. 1 shows an electronic ballast for a discharge lamp in the prior art. The ballast includes a DC (direct current) power supply circuit 1, a power conversion circuit 2, a load circuit 3, a drive circuit 4 and a frequency control circuit 5. The DC power supply circuit 1 is configured to concert AC (alternating current) voltage from an AC power source Vin into DC voltage $V_1$. The power conversion circuit 2 includes an inverter circuit 20 and a resonant circuit 25. The circuit 2 is configured to convert the DC voltage from the DC power supply circuit 1 into AC voltage by the inverter circuit 20 to apply the AC voltage across a load circuit 3 including at least the discharge lamp via the resonant circuit 25. The load circuit 3 includes an induction coil 30 connected with the output of the power conversion circuit 2, and an electrodeless discharge lamp 31 in the proximity of the coil 30. In an example, as shown in FIG. 2, the load circuit 3 may include a fluorescent lamp 32 connected with the output of the circuit 2, and a capacitor 33 connected between both filaments of the lamp 32.

The drive circuit 4 is configured to adjust an operating frequency of the inverter circuit 20 in accordance with a control signal from the frequency control circuit 5. The frequency control circuit 5 is configured to substantially supply the control signal to the drive circuit 4 to sweep the operating frequency of the inverter circuit 20 from a start frequency to an end frequency and thereby to increase the AC voltage (i.e., load voltage) $V_3$ applied across the load circuit 3. For example, the end frequency is set to a resonance frequency of the combination of the resonant circuit 25 and the load circuit 3 after ignition of the discharge lamp (i.e., the lamp is lit), while the start frequency is set to a higher frequency than the resonance frequency. Accordingly, the operation frequency of the inverter circuit 20 is swept from the start frequency to the end frequency, so that the load voltage is increased. Thus, by increasing the load voltage, the discharge lamp can be successfully started even under the influence of change of the load impedance.

However, in the construction that a discharge lamp is ignited by resonance, the resonance characteristics corresponding to the above-mentioned combination can be changed by various factors such as change in ambient temperature; dispersion and secular change of components; and a metal enclosure (a reflector, etc.) of luminaire including a ballast. Especially, if the discharge lamp is an electrodeless discharge lamp 31, the lamp 31 requires higher Q than a fluorescent lamp and accordingly the load impedance is remarkably changed by the proximity of the reflector 90 to the lamp 31 as shown in FIG. 4. The load voltage is also changed. That is, an inductance component caused by the reflector 90 is connected in parallel with the induction coil 30, and accordingly an induction current $I_{90}$ flows through the inductance component by electromagnetic induction from the coil 30. Consequently, as shown in FIG. 3, the resonance characteristics in start and operation modes shift to high frequency side, namely from the resonance characteristic "without change in load impedance" to the resonance characteristic "with change in load impedance". Thus, if the end frequency fe to be set to the resonance frequency in the operation mode shifts to a lower frequency than the resonance frequency, the discharge lamp can be turned off spontaneously (i.e., flame failure can occur) and accordingly it becomes difficult to maintain the lighting operation of the lamp.

As shown in FIG. 1, if a variable resistor VR is connected to the frequency control circuit 5, the end frequency fe can be adjusted with the resistor VR. Therefore, the end frequency fe can be adjusted to the resonance frequency in the resonance characteristic "with change in load impedance". However, various luminaire types exist, and accordingly every luminaire requires manual adjustment of the end frequency, and manufacturing cost becomes higher.

The device disclosed in Japanese Patent Application Publication No. 2003-332090 published on Nov. 21, 2003 includes a means for changing a setting value (target value) of the output of a power amplifier in response to a frequency in connection with an output frequency of an oscillation means.

DISCLOSURE OF THE INVENTION

It is an object of the present invention to suitably maintain operation of a discharge lamp after ignition without manually adjusting an end frequency of sweep of an inverter circuit's operation frequency.

An electronic ballast for a discharge lamp of the present invention comprises a power conversion circuit, a drive circuit and a frequency control circuit. The power conversion circuit includes an inverter circuit and a resonant circuit. The power conversion circuit is configured to convert DC voltage from a DC power supply circuit into AC voltage with the inverter circuit to apply the AC voltage across a load circuit including at least the discharge lamp via the resonant circuit. The drive circuit is configured to adjust an operating frequency of the inverter circuit in accordance with a control signal from the frequency control circuit. The frequency control circuit is configured to supply the control signal to the drive circuit to sweep the operating frequency of the inverter circuit from a start frequency to an end frequency and thereby to increase the AC voltage (i.e., load voltage) applied across the load circuit. According to an aspect of the present invention, the electronic ballast further comprises a predictive circuit and a correction circuit. The predictive circuit is configured to predict a resonance frequency of the combination of the resonant circuit and the load circuit after ignition of the discharge lamp. The resonance frequency is predicted based on an input signal representing the load voltage in the period of time from the start of sweep of the operating frequency through a time point immediately after ignition of the discharge lamp. The correction circuit is configured to change said end frequency to the resonance frequency. In this invention, the end frequency is automatically changed to the resonance frequency of combination of the resonant circuit and the load circuit after ignition of the discharge lamp. Therefore, it is possible to suitably maintain operation of the discharge lamp after ignition without manually adjusting the end frequency of sweep of the inverter circuit's operation frequency.

In an embodiment, the predictive circuit is configured: (A) to use collinear (straight-line) or curve (curve line) approximation for each combination of input signals representing the load voltage in the said period of time and operation frequencies of the inverter circuit corresponding to the input signals; and (B) to obtain the resonance frequency of said combination from a frequency corresponding to an intersection point of the straight or curve line with substantially maximum AC voltage of the power conversion circuit. The operation frequency of the inverter circuit is derived from the control signal.

In an embodiment, the predictive circuit is configured to calculate an actual change rate to obtain the resonance frequency of said combination from the resonance frequency having the same correlation as a specified correlation with the actual change rate. The actual change rate is a change rate of input signals representing the load voltage obtained at the start and the end of a specified period of time. The specified correlation is a correlation between a change rate of input signals representing the load voltage previously obtained at the start and the end of a specified period of time, and a previously obtained resonance frequency of the combination. The specified period of time is a period of time from the start of sweep of the operation frequency through a point in time before ignition of the discharge lamp.

In an embodiment, the predictive circuit is configured to receive an input signal representing the load voltage at the start of sweep of the operation frequency to obtain the resonance frequency of said combination from the resonance frequency having the same correlation as a specified correlation with the input signal. The specified correlation is a correlation between an input signal representing the load voltage previously obtained at the start of sweep of the operation frequency, and a previously obtained resonance frequency of said combination.

In an embodiment, the predictive circuit is configured: (a) to drive an operation frequency of the inverter circuit, corresponding to an input signal representing the load voltage equal to specified voltage, from the control signal; and (b) to obtain the resonance frequency of said combination from the resonance frequency having the same correlation as a specified correlation with the operation frequency. The specified correlation is a correlation between an operation frequency of the inverter circuit, corresponding to an input signal representing the load voltage equal to the specified voltage, previously derived from the control signal, and a previously obtained resonance frequency of said combination.

In an embodiment, the predictive circuit is configured: (i) to drive an operation frequency of the inverter circuit, corresponding to an input signal representing the load voltage at a time point immediately after ignition of the discharge lamp, from the control signal; and (ii) to obtain the resonance frequency of said combination from the resonance frequency having the same correlation as a specified correlation with the operation frequency. The specified correlation is a correlation between an operation frequency of the inverter circuit, corresponding to an input signal representing the load voltage at a time point immediately after ignition of the discharge lamp, previously derived from the control signal, and a previously obtained resonance frequency of said combination.

In an embodiment, the frequency control circuit supplies the drive circuit with the control signal for adjusting the operation frequency of the inverter circuit so that the load voltage becomes equal to target voltage by feedback control of the load voltage.

In an embodiment, the frequency control circuit is configured to periodically sweep the operation frequency of the inverter circuit from the start frequency to the end frequency and thereby to periodically turn the discharge lamp on and off, in accordance with a dimming signal.

In an embodiment, the load circuit comprises an induction coil connected with the output of the power conversion circuit, and an electrodeless discharge lamp in the proximity of the induction coil.

In an embodiment, luminaire of the present invention comprises the electronic ballast above.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

First Embodiment

Figure 5:
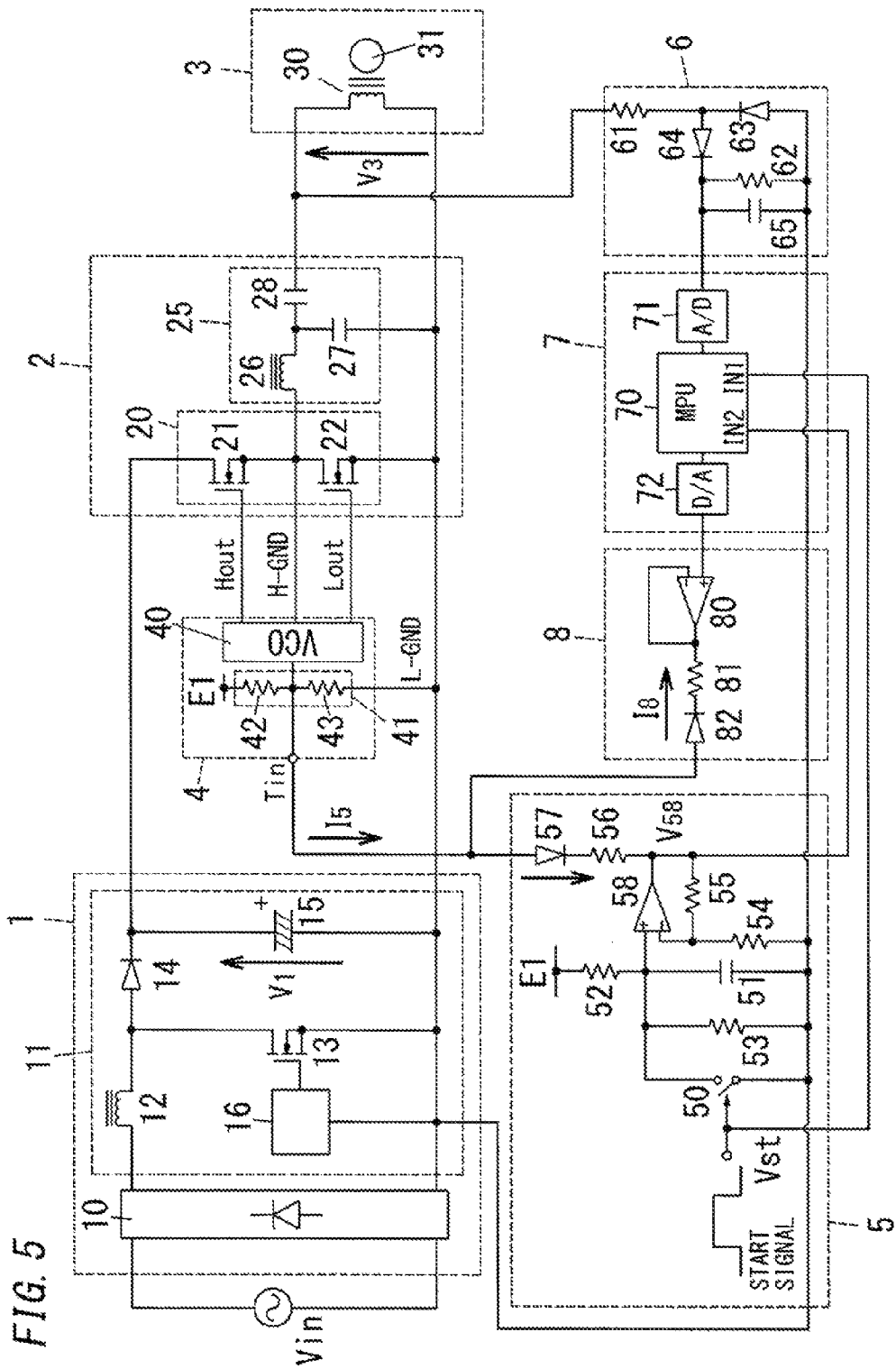
FIG. 5 is a schematic diagram of an electronic ballast for a discharge lamp, in accordance with a first embodiment of the present invention.

FIG. 5 shows an electronic ballast for a discharge lamp, in accordance with a first embodiment of the present invention. The ballast includes a DC power supply circuit 1, a power conversion circuit 2, a load circuit 3, a drive circuit 4 and a frequency control circuit 5 in the same way as the ballast of FIG. 1.

The DC power supply circuit 1 is configured to convert AC voltage from an AC power source Vin into DC voltage $V_1$. For example, the circuit 1 includes a full wave rectifier 10 and a boost converter 11. The converter 11 is formed of an inductor 12, a switching device (e.g., FET) 13, a diode 14, a capacitor 15 and a boost control circuit 16.

The power conversion circuit 2 includes an inverter circuit 20 and a resonant circuit 25. This circuit 2 is configured to convert DC voltage $V_1$ from the DC power supply circuit 1 into AC voltage with the inverter circuit 20 to apply the AC voltage across a load circuit 3 via the resonant circuit 25. For example, the inverter circuit 20 is a half bridge inverter and includes switching devices (e.g., FETs) 21 and 22. The resonant circuit 25 includes, for example, an inductor 26 and capacitors 27 and 28.

Figure 2:
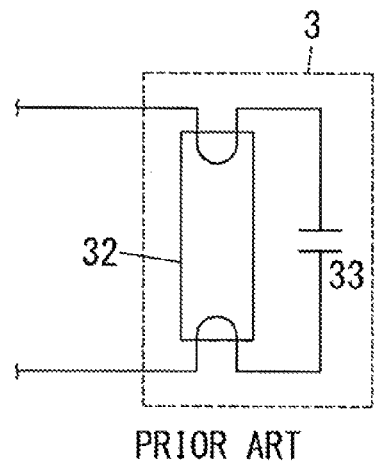
FIG. 2 illustrates an example of a load circuit.
Figure 3:
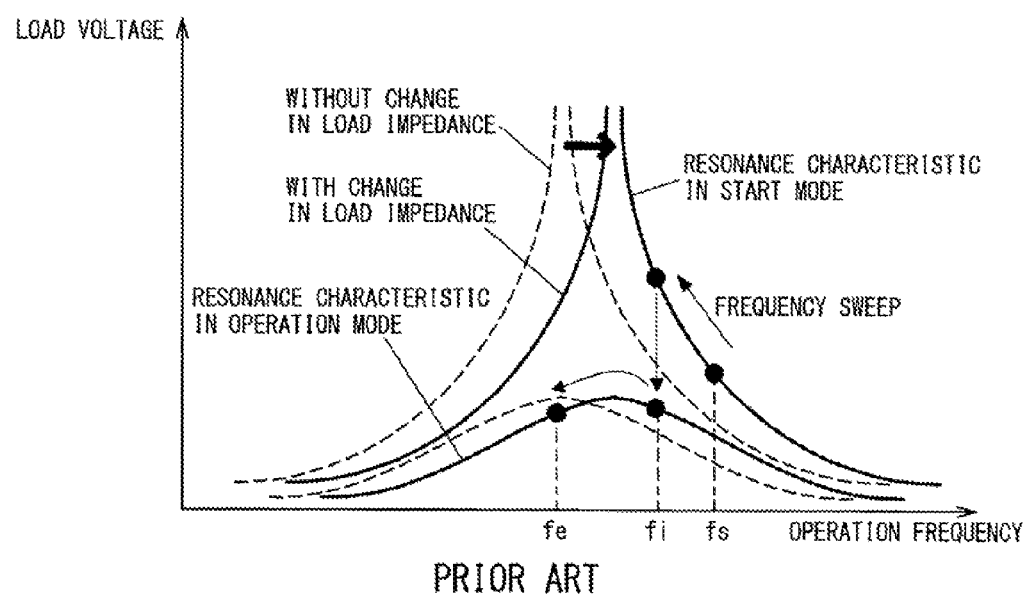
FIG. 3 is an explanatory diagram of an issue of the electronic ballast in FIG. 1.

The load circuit 3 includes at least a discharge lamp. In the example of FIG. 5, the load circuit 3 includes an induction coil 30 connected with the output of the power conversion circuit 2, and an electrodeless discharge lamp 31 in the proximity of the coil 30. The lamp 31 has an envelope such as a glass bulb, a glass sphere or the like, filled with a discharge gas such as inert gas, metal vapor and so on (e.g., mercury and rare gas). The envelope is transparent or includes phosphor applied to the inner face. However, not limited to this, the load circuit of the present invention may include, for example, a fluorescent lamp 32 and a capacitor 33 like FIG. 2.

The drive circuit 4 is configured to adjust an operating frequency of the inverter circuit 20 in accordance with a control signal $I_5$ substantially from the frequency control circuit 5. For example, the circuit 4 includes a voltage divider 41, a VCO (voltage controlled oscillator) 40 and so on. The voltage divider 41 is formed of resistors 42 and 43 connected in series between a reference voltage source E1 and ground. The junction of the resistors 42 and 43 is connected with a terminal Tin for receiving the control signal $I_5$ substantially from the frequency control circuit 5, and an input terminal of the VCO 40. Accordingly, voltage of the terminal Tin corresponding to the control signal $I_5$ is applied to the input terminal of the VCO 40. The VCO 40 supplies each gate of the switching devices 21 and 22 with a square shaped drive signal having an oscillation frequency corresponding to the control signal $I_5$, namely the voltage of the terminal Tin. In the first embodiment, if the voltage of the terminal Tin is increased or decreased, the oscillation frequency is decreased or increased, respectively. Both of the drive signals also have the phase difference of approximately 180°, and are applied across terminals $H_{OUT}$ and $H_{GND}$ and terminals $L_{OUT}$ and $L_{GND}$. Accordingly, the switching devices 21 and 22 are alternately turned on and off by the drive signals having an oscillation frequency corresponding to the control signal $I_5$. Consequently, the inverter circuit 20 operates by the frequency (i.e., operation frequency) corresponding to the control signal $I_5$.

The frequency control circuit 5 is configured to supply the control signal to drive circuit 4 and thereby to adjust the operation frequency of the inverter circuit 20 through the drive circuit 4. For example, the circuit 5 increases the AC voltage applied across the load circuit 3, namely load voltage $V_3$, by supplying the control signal to drive circuit 4 to sweep the operating frequency of the inverter circuit 20 from a start frequency to an end frequency. The load voltage $V_3$ is increased from lower voltage than start voltage and restart voltage for starting and restarting the lamp 31 to higher voltage than the start voltage and restart voltage.

In the example of FIG. 5, the frequency control circuit 5 is formed of a switch device 50, a capacitor 51, resistors 52-56, a diode 57 and an operational amplifier (OP amp) 58. The switch device 50 turns the frequency control circuit 5 on or off in accordance with a start signal Vst. For example, the frequency control circuit 5 is turned on if the switch device 50 is turned off, while the frequency control circuit 5 is turned off if the switch device 50 is turned on. The capacitor 51 and the resistor 52 constitute an integral circuit, and are supplied with reference voltage of the reference voltage source E1. The resistors 54 and 55 and the OP amp 58 constitute a non-inverting amplifier and amplifies the output of the integral circuit. Also, by means of the diode 57, the frequency control circuit 5 works while the output voltage of the non-inverting amplifier is equal to or lower than the voltage of the terminal Tin. Specifically, the output voltage of the non-inverting amplifier is set to be equal to or higher than the voltage across the resistor 43 by only the voltage of the reference voltage source E1 when the load circuit 3 has no change in impedance (e.g., the ballast has no metal enclosure (the reflector 90 of FIG. 4)).

The operation principle of the drive circuit 4 and the frequency control circuit 5 is explained. In the frequency control circuit 5, when the switch device 50 is turned off in accordance with a start signal Vst, the integral circuit is activated. The voltage across the capacitor 51 is then increased (swept) in response to a time constant of the integral circuit, while the output voltage $V_{58}$ of the non-inverting amplifier is increased in response to the output of the integral circuit. Thereby, the potential difference between the output of the non-inverting amplifier and the terminal Tin is reduced, and accordingly the control signal (i.e., a current drawn from the terminal Tin) is decreased, while a current through the resistor 43 is increased and then the voltage across the resistor 43 is increased. Consequently, each oscillation frequency of drive signals supplied to the gates of the switching devices 21 and 22 is decreased. That is, the operation frequency of the inverter circuit 20 is decreased (swept) from the start frequency to the end frequency in response to the output of the integral circuit. Thereby, the load voltage $V_3$ is increased from lower voltage than the start voltage and restart voltage to higher voltage than the start voltage and restart voltage. A high frequency current in the range from tens of kHz to several MHz is also supplied to the induction coil 30. Accordingly, the lamp 31 can be lit before the operation frequency is increased to the end frequency. At this point, a high-frequency plasma current is generated inside the lamp 31 by the high-frequency electromagnetic field from the coil 30, and the lamp 31 emits ultraviolet rays or visible light.

According to an aspect of the present invention, the electronic ballast further includes a detection circuit 6, a predictive circuit 7 and a correction circuit 8. These circuits are incorporated in the ballast in place of the variable resistor VR of FIG. 1.

The detection circuit 6 is configured to supply the predictive circuit 7 with a detection signal (an analog voltage signal) representing the load voltage $V_3$. In the example of FIG. 5, the circuit 6 includes a voltage divider, a half wave rectifier and a smoothing capacitor 65. The voltage divider is formed of resistors 61 and 62. The half wave rectifier is formed of diodes 63 and 64.

The predictive circuit 7 is configured to predict a resonance frequency of the combination of the resonant circuit 25 and the load circuit 3 after ignition of the discharge lamp, and to supply the correction circuit 8 with a correction signal for changing the end frequency to the resonance frequency. The resonance frequency is predicted based on an input signal representing the load voltage $V_3$ in the period of time from the start of sweep of the inverter circuit's operating frequency through a time point immediately after ignition of the discharge lamp. The resonance frequency and the period of time are hereinafter referred to as a "predicted resonance frequency" and a "maximum detection period", respectively.

For example, the predictive circuit 7 includes an A/D converter 71, a D/A converter 72 and an MPU (microprocessor unit) 70. The A/D converter 71 is configured to convert the detection signal from the detection circuit 6 into a digital signal to supply the digital signal to a digital input terminal of the MPU 70. Thereby, the MPU 70 can receive a digital signal (an input signal) representing the load voltage $V_3$. The D/A converter 72 is configured to convert a correction signal from a digital output terminal of the MPU 70 into an analog voltage signal to supply the analog voltage signal to the correction circuit 8.

The MPU 70 further has input terminals IN1 and IN2, and receives the start signal Vst and the output voltage $V_{58}$ of the non-inverting amplifier via the input terminals IN1 and IN2, respectively. The voltage $V_{58}$ is received via a built-in A/D converter of the input terminal IN2. The MPU 70 also includes a storage device that stores first and second tables in addition to a program for obtaining the predicted resonance frequency, and so on. The first table includes different combinations of digital values of voltage $V_{58}$ and operation frequencies of the inverter circuit 20, wherein the digital values are obtained from a control signal $I_5$ and the operation frequencies correspond to the digital values. The second table includes different combinations of operation frequencies of the inverter circuit 20 (oscillation frequencies of the VCO) and digital values of voltage of the terminal Tin, wherein the digital values correspond to the operation frequencies.

Figure 6:
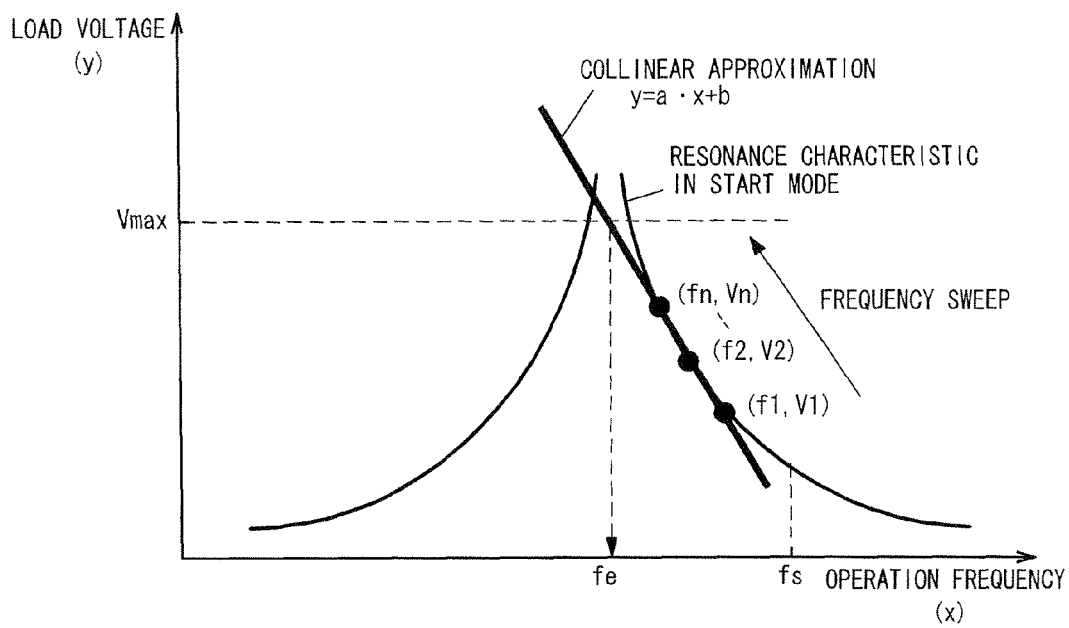
FIG. 6 is an explanatory diagram of prediction of the first embodiment.

In the first embodiment, as shown in FIG. 6, the MPU 70 is configured to obtain a predicted resonance frequency by collinear (straight-line) approximation. That is, the MPU 70 receives digital signals V1-Vn representing the load voltage $V_3$ through the A/D converter 71 during a specified period of time in the maximum detection period, and also respectively obtains digital values of the voltage $V_{58}$ in synchronization with the digital signals V1-Vn through the input terminal IN2. These digital values are respectively converted into operation frequencies f1-fn by the first table. In short, the operation frequencies f1-fn are derived from the control signal $I_5$ for adjusting the oscillation frequency of the VCO 40. The MPU 70 also uses collinear (straight-line) approximation for each combination of the signals V1-Vn and the operation frequencies f1-fn, and obtains a predicted resonance frequency from the frequency corresponding to an intersection point of the straight-line with substantially maximum AC voltage Vmax of the power conversion circuit 2. In the example of FIG. 6, the predicted resonance frequency is the frequency corresponding to the intersection point. In the approximation function of FIG. 6, "y" and "x" are load voltage and an operation frequency, respectively, and each of "a" and "b" is a coefficient. The MPU 70 also obtains a specified digital value of voltage of the terminal Tin (input voltage of VCO) from the second table to supply the digital value to the correction circuit 8 via the D/A converter 72. That is, the correction signal is supplied. The specified digital value corresponds to the operation frequency substantially equal to the predicted resonance frequency in the second table.

The correction circuit 8 is configured to change the end frequency to the predicted resonance frequency. For example, the circuit 8 is formed of a voltage follower 80, a resistor 81 and a diode 82, and supplies correction voltage to the terminal Tin via the resistor 81 and the diode 82. The correction voltage is the voltage of the terminal Tin corresponding to the predicted resonance frequency. In short, the circuit 8 is configured to turn the diode 82 on when the voltage of the terminal Tin is equal to or higher than the correction voltage and then to draw a current $I_8$ from the terminal Tin so that the voltage of the terminal Tin becomes equal to the correction voltage.

Figure 7:
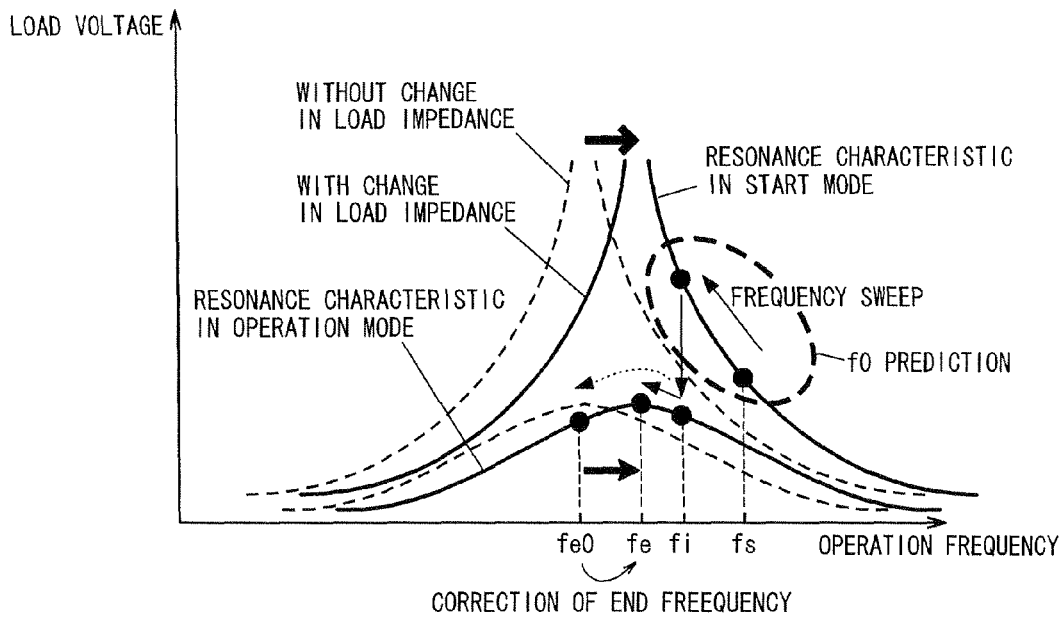
FIG. 7 is an explanatory diagram of operation of the first embodiment.
Figure 8:
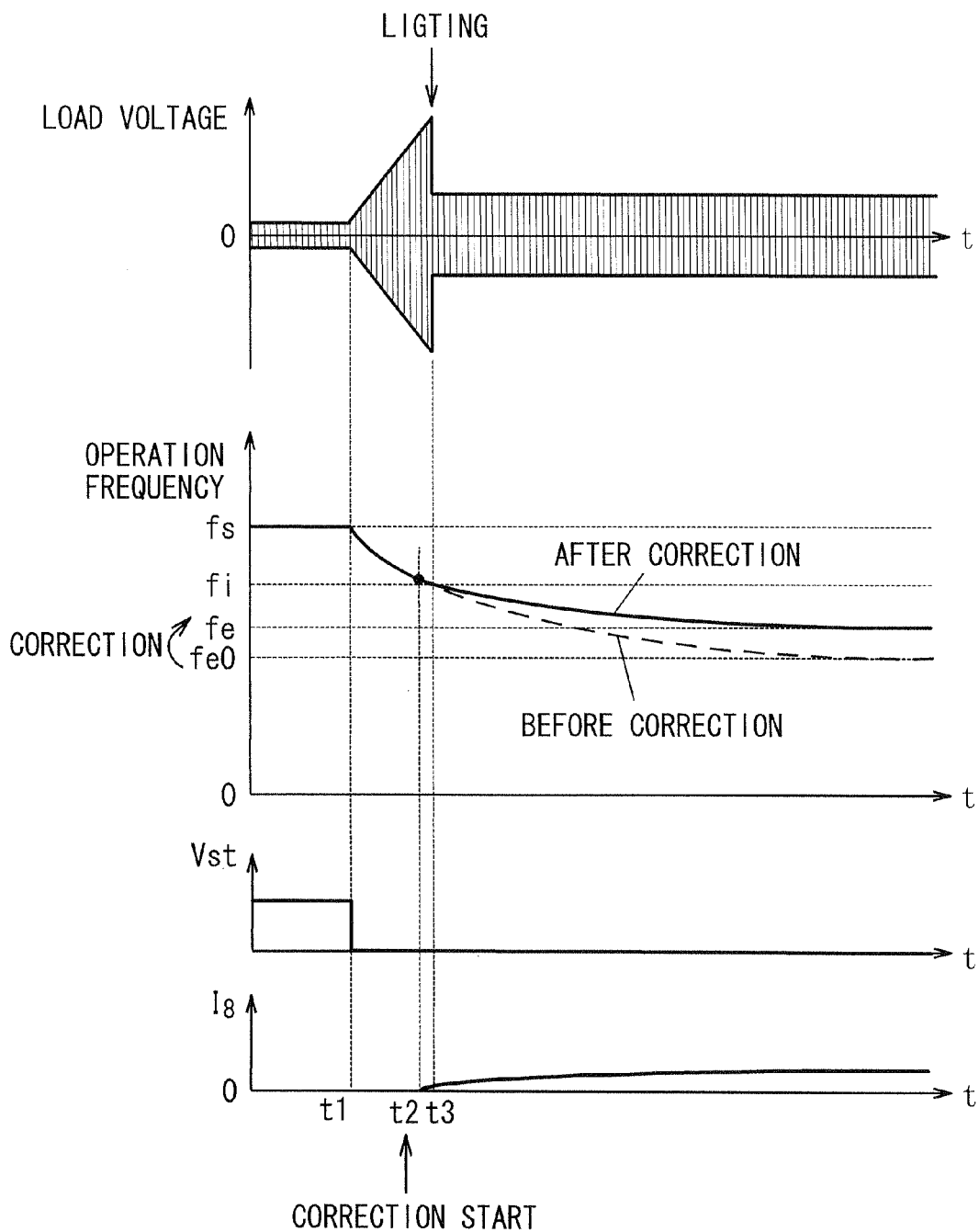
FIG. 8 is an explanatory diagram of operation of the first embodiment.

The operation of the detection circuit 6, predictive circuit 7 and correction circuit 8 is explained. As shown in FIGS. 7 and 8, when the switch device 50 is turned off at "t1" in accordance with the start signal Vst, the operation signal of the inverter circuit 20 is decreased from the start frequency fs through the drive circuit 4 and frequency control circuit 5. Subsequently, during a specified period of time, the MPU 70 receives digital signals V1-Vn representing load voltage $V_3$ via the A/D converter 71, and also respectively obtains digital values of voltage $V_{58}$ in synchronization with the digital signals V1-Vn via the input terminal IN2. The MPU 70 then uses collinear (straight-line) approximation for each combination of the signals V1-Vn and the operation frequencies f1-fn obtained from the first table, and obtains the frequency corresponding to an intersection point of the straight-line with the maximum AC voltage Vmax, namely a predicted resonance frequency. The MPU 70 then obtains the digital value of voltage of the terminal Tin corresponding to the predicted resonance frequency from the second table and supplies the digital value to the correction circuit 8 via the D/A converter 72. The correction circuit 8 supplies the terminal Tin with voltage of the terminal Tin corresponding to the predicted resonance frequency at "t2". Thereby, the end frequency fe0 is changed to the predicted resonance frequency fe. The operation frequency of the inverter circuit 20 then is decreased to the predicted resonance frequency fe through the drive circuit 4 and frequency control circuit 5.

Figure 1:
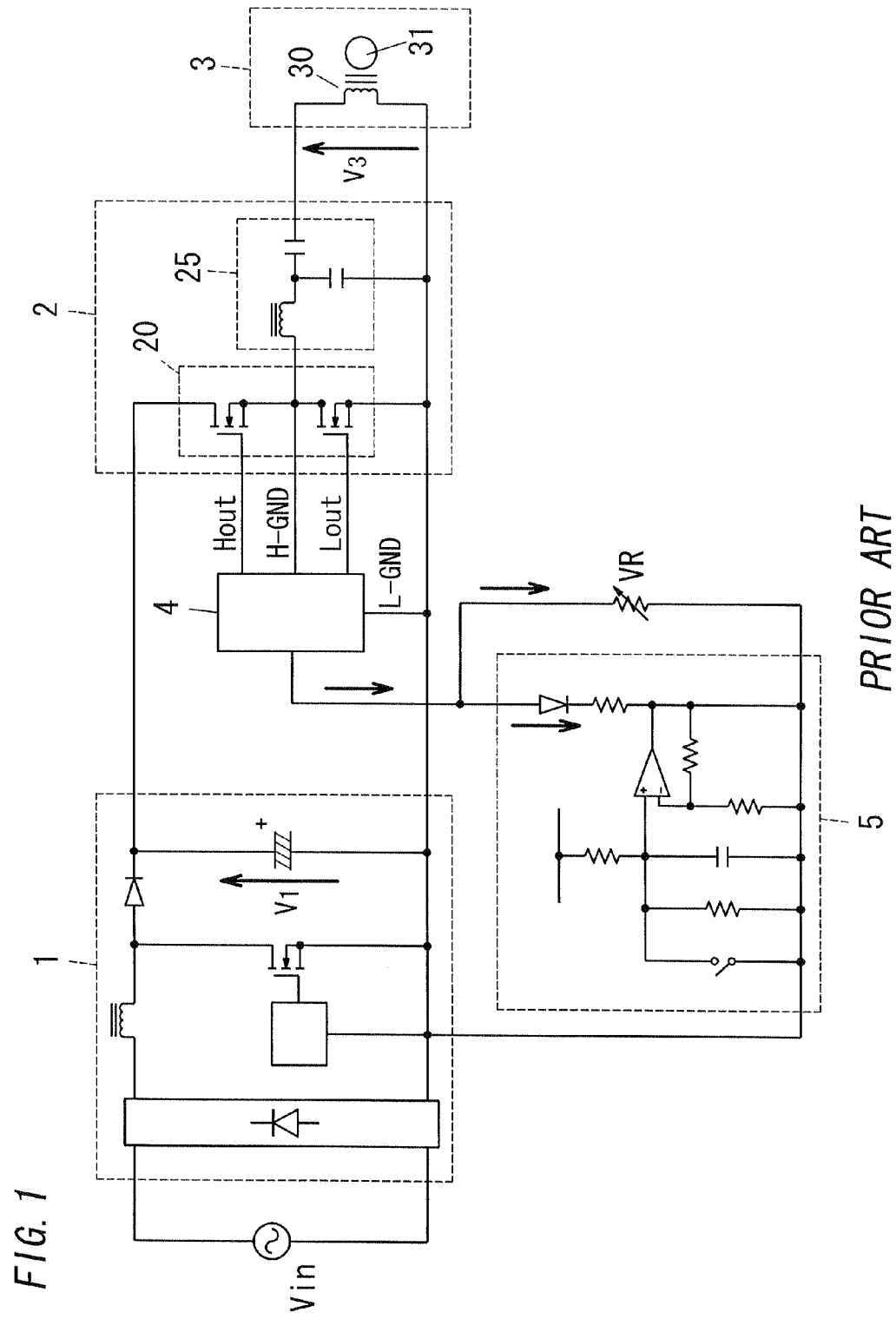
FIG. 1 is a schematic diagram of an electronic ballast for a discharge lamp in the prior art.

In the first embodiment, the end frequency fe0 is automatically changed to the resonance frequency fe of the combination of the resonant circuit 25 and the load circuit 3 after ignition of the discharge lamp. Accordingly, it is possible to suitably maintain operation of the discharge lamp after ignition without manually adjusting the end frequency fe0 of sweep of the inverter circuit's operation frequency. The variable resistor VR of FIG. 1 is also unnecessary.

Figure 9:
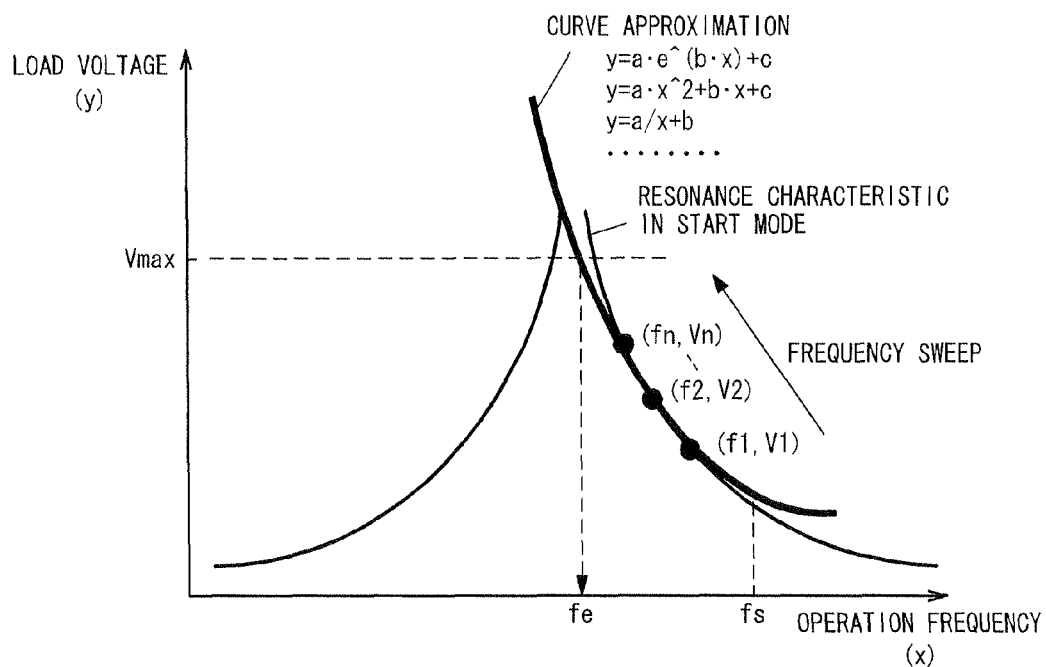
FIG. 9 illustrates an alternate example of prediction.

In an alternate example, as shown in FIG. 9, the predictive circuit 7 is configured to use curve (curve line) approximation for each combination of the signals V1-Vn and the operation frequencies f1-fn in place of the collinear approximation. For example, an approximation function such as $y=a \cdot \exp(b \cdot x)+c$, $y=a \cdot x^2+b \cdot x+c$, or $y=a/x+b$ can be used, where each of "a", "b" and "c" is a coefficient. The approximation function, specified period of time, and the combination number of signals V1-Vn and operation frequencies f1-fn are selected so as to reduce the difference between a predicted resonance frequency and an actual resonance frequency based on an actual resonance characteristic in the start mode.

In an example, the electronic ballast reduces a sweep speed of the integral circuit output immediately after receiving a digital signal Vn representing the load voltage $V_3$. In this example, operation time of the predictive circuit 7 and the correction circuit 8 can be extended.

Second Embodiment

Figure 10:
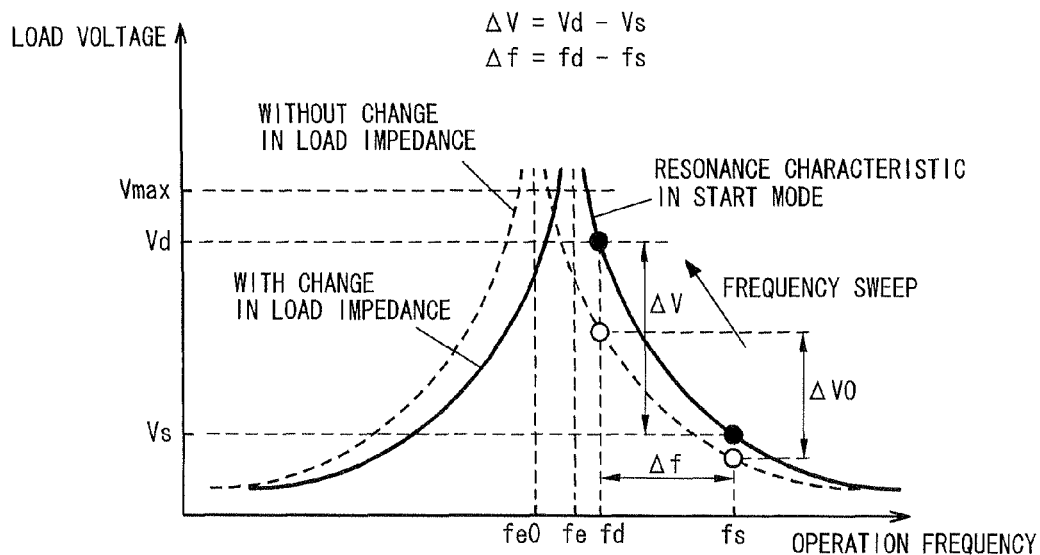
FIG. 10 is an explanatory diagram of prediction of an electronic ballast for a discharge lamp, in accordance with a second embodiment of the present invention.

FIG. 10 is an explanatory diagram of prediction of an electronic ballast for a discharge lamp, in accordance with a second embodiment of the present invention. The ballast in the second embodiment is formed in almost the same way as that in the first embodiment, and characterized by operation for obtaining a predicted resonance frequency. For the purpose of clarity, like kind elements are assigned the same reference numerals as depicted in the first embodiment.

Figure 11:
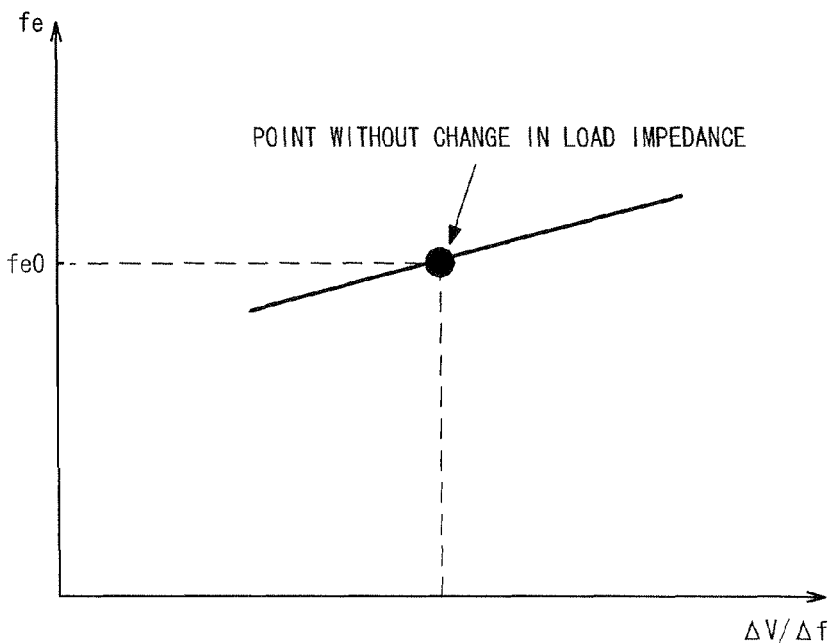
FIG. 11 is an explanatory diagram of prediction of the second embodiment.

As shown in FIG. 10, an MPU 70 of a predictive circuit 7 is configured to calculate an actual change rate to obtain the resonance frequency of the combination of a resonant circuit 25 and a load circuit 3 from the resonance frequency (predicted resonance frequency) having the same correlation as a specified correlation with the actual change rate. The actual change rate is a change rate of input signals representing load voltage $V_3$ obtained at the start and the end of a specified period of time, and is given by $(Vd-Vs)/\Delta f$. The specified correlation is a correlation between a change rate $(\Delta V_0/\Delta f)$ of input signals representing the load voltage previously obtained at the start and the end of a specified period of time and a previously obtained resonance frequency (fe0) of the combination. Also, as shown in FIG. 11, the specified correlation is previously obtained when the load circuit 3 has no change in impedance (e.g., the ballast has no metal enclosure (the reflector 90 of FIG. 4)). The specified period of time is a period of time (fs-fd) from the start, of sweep of an inverter circuit's operation frequency through a point in time before ignition of the discharge lamp. In the second embodiment, the predicted resonance frequency is employed as a resonance frequency of the combination of the resonant circuit 25 and the load circuit 3.

In the second embodiment, in comparison with the first embodiment, the sampling number of input signals representing the load voltage can be decreased, and thereby the operation time for obtaining a predicted resonance frequency can be shortened. Consequently, the correction circuit 8 can be promptly activated.

Third Embodiment

Figure 12:
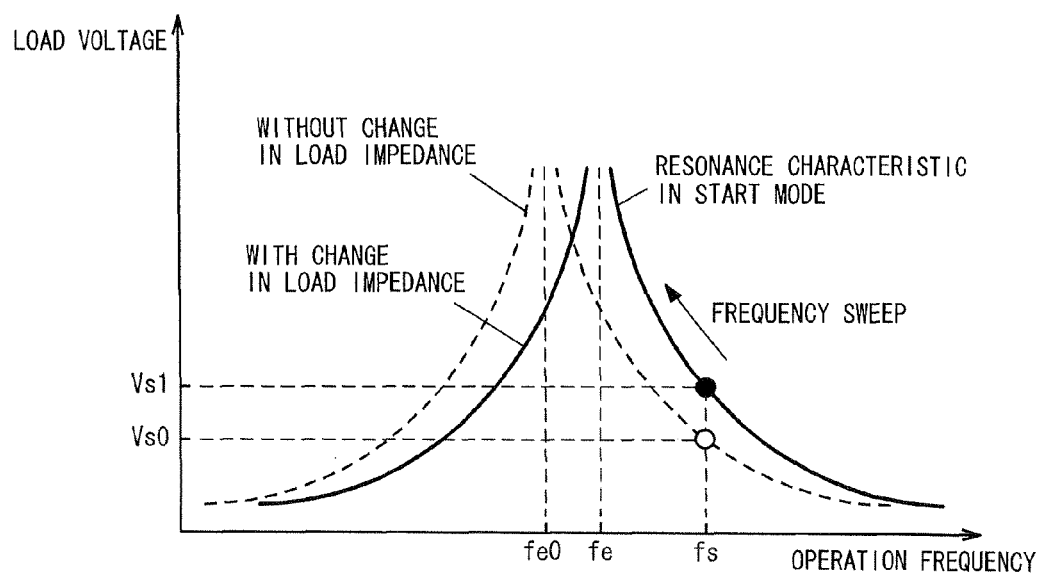
FIG. 12 is an explanatory diagram of prediction of an electronic ballast for a discharge lamp, in accordance with a third embodiment of the present invention.

FIG. 12 is an explanatory diagram of prediction of an electronic ballast for a discharge lamp, in accordance with a third embodiment of the present invention. The ballast in the third embodiment is formed in almost the same way as that in the first embodiment, and characterized by operation for obtaining a predicted resonance frequency. For the purpose of clarity, like kind elements are assigned the same reference numerals as depicted in the first embodiment.

As shown in FIG. 12, an MPU 70 of a predictive circuit 7 is also configured to obtain the resonance frequency of the combination of a resonant circuit 25 and a load circuit 3. That is, the MPU 70 receives an input signal representing load voltage (Vs1) at the start of sweep of an inverter circuit's operation frequency. The MPU 70 also obtains the resonance frequency of the combination from the resonance frequency (predicted resonance frequency) having the same correlation as a specified correlation with the input signal. The specified correlation is a correlation between an input signal representing load voltage (Vs0) previously obtained at the start of sweep of the operation frequency and a previously obtained resonance frequency (fe0) of the combination. Also, the specified correlation is previously obtained when the load circuit 3 has no change in impedance (e.g., the ballast has no metal enclosure). In the third embodiment, the predicted resonance frequency is employed as a resonance frequency of the combination of the resonant circuit 25 and the load circuit 3.

In the third embodiment, since an input signal representing the load voltage is taken only at the start of sweep of the operation frequency, the operation time for obtaining the predicted resonance frequency can be more shortened. Consequently, the correction circuit 8 can be more promptly activated. Because of this, the third embodiment can be also applied to the ballast including an integral circuit of high speed output sweep.

Fourth Embodiment

Figure 13:
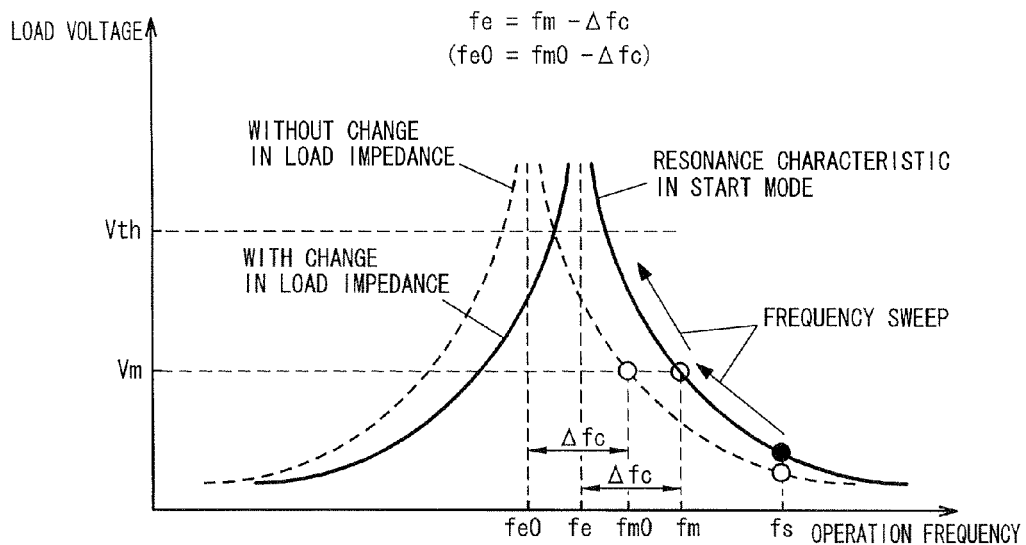
FIG. 13 is an explanatory diagram of prediction of an electronic ballast for a discharge lamp, in accordance with a fourth embodiment of the present invention.

FIG. 13 is an explanatory diagram of prediction of an electronic ballast for a discharge lamp, in accordance with a fourth embodiment of the present invention. The ballast in the fourth embodiment is formed in almost the same way as that in the first embodiment, and characterized by operation for obtaining a predicted resonance frequency. For the purpose of clarity, like kind elements are assigned the same reference numerals as depicted in the first embodiment.

As shown in FIG. 13, an MPU 70 of a predictive circuit 7 is also configured to obtain the resonance frequency of the combination of a resonant circuit 25 and a load circuit 3. That is, the MPU 70 drives an operation frequency (fm) of an inverter circuit 20, corresponding to an input signal representing the load voltage equal to specified voltage (Vm), from the control signal. The MPU 70 also obtains the resonance frequency of the combination from the resonance frequency (predicted resonance frequency) having the same correlation as a specified correlation with the operation frequency. The specified voltage is lower voltage than start voltage and restart voltage of the discharge lamp. The specified correlation is a correlation ($\Delta fc$) between an operation frequency of the inverter circuit 20, corresponding to an input signal representing the load voltage equal to the specified voltage, previously derived from the control signal and a previously obtained resonance frequency (fe0) of the combination. Also, the specified correlation is previously obtained when the load circuit 3 has no change in impedance (e.g., the ballast has no metal enclosure). In the fourth embodiment, the predicted resonance frequency is given by fm$-\Delta fc$, and is employed as a resonance frequency of the combination of the resonant circuit 25 and the load circuit 3.

In the fourth embodiment, since the predicted resonance frequency is given by fm$-\Delta fc$, a predicted resonance frequency can be obtained by a simple operation.

Fifth Embodiment

Figure 14:
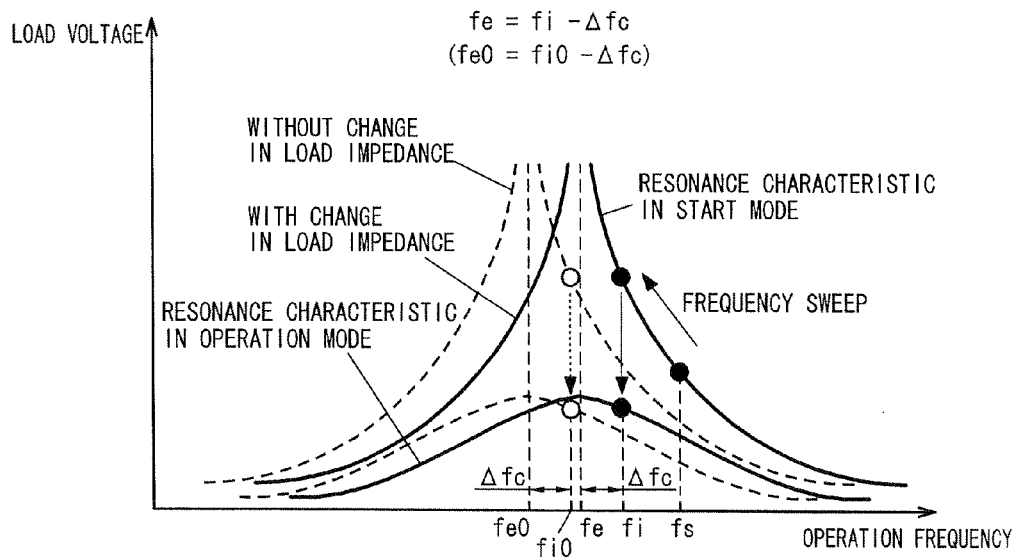
FIG. 14 is an explanatory diagram of prediction of an electronic ballast for a discharge lamp, in accordance with a fifth embodiment of the present invention.

FIG. 14 is an explanatory diagram of prediction of an electronic ballast for a discharge lamp, in accordance with a fifth embodiment of the present invention. The ballast in the fifth embodiment is formed in almost the same way as that in the first embodiment, and characterized by operation for obtaining a predicted resonance frequency. For the purpose of clarity, like kind elements are assigned the same reference numerals as depicted in the first embodiment.

As shown in FIG. 14, an MPU 70 of a predictive circuit 7 is also configured to obtain the resonance frequency of the combination of a resonant circuit 25 and a load circuit 3. That is, the MPU 70 drives an operation frequency (fi) of the inverter circuit 20, corresponding to an input signal representing load voltage at a time point immediately after ignition of the discharge lamp, from the control signal. The MPU 70 also obtains the resonance frequency of the combination from the resonance frequency (predicted resonance frequency) having the same correlation as a specified correlation with the operation frequency. The specified correlation is a correlation ($\Delta fc$) between an operation frequency (fi0) of the inverter circuit 20, corresponding to an input signal representing load voltage at a time point immediately after ignition of the discharge lamp, previously derived from the control signal, and a previously obtained resonance frequency (fe0) of the combination. Also, the specified correlation is previously obtained when the load circuit 3 has no change in impedance (e.g., the ballast has no metal enclosure). In the fifth embodiment, the predicted resonance frequency is given by fi$-\Delta fc$, and is employed as a resonance frequency of the combination of the resonant circuit 25 and the load circuit 3. The ignition of the discharge lamp is detected by level drop of an input signal representing load voltage.

In the fifth embodiment, since the predicted resonance frequency is given by fi−Δfc, the predicted resonance frequency can be obtained by a simple operation.

Sixth Embodiment

Figure 15:
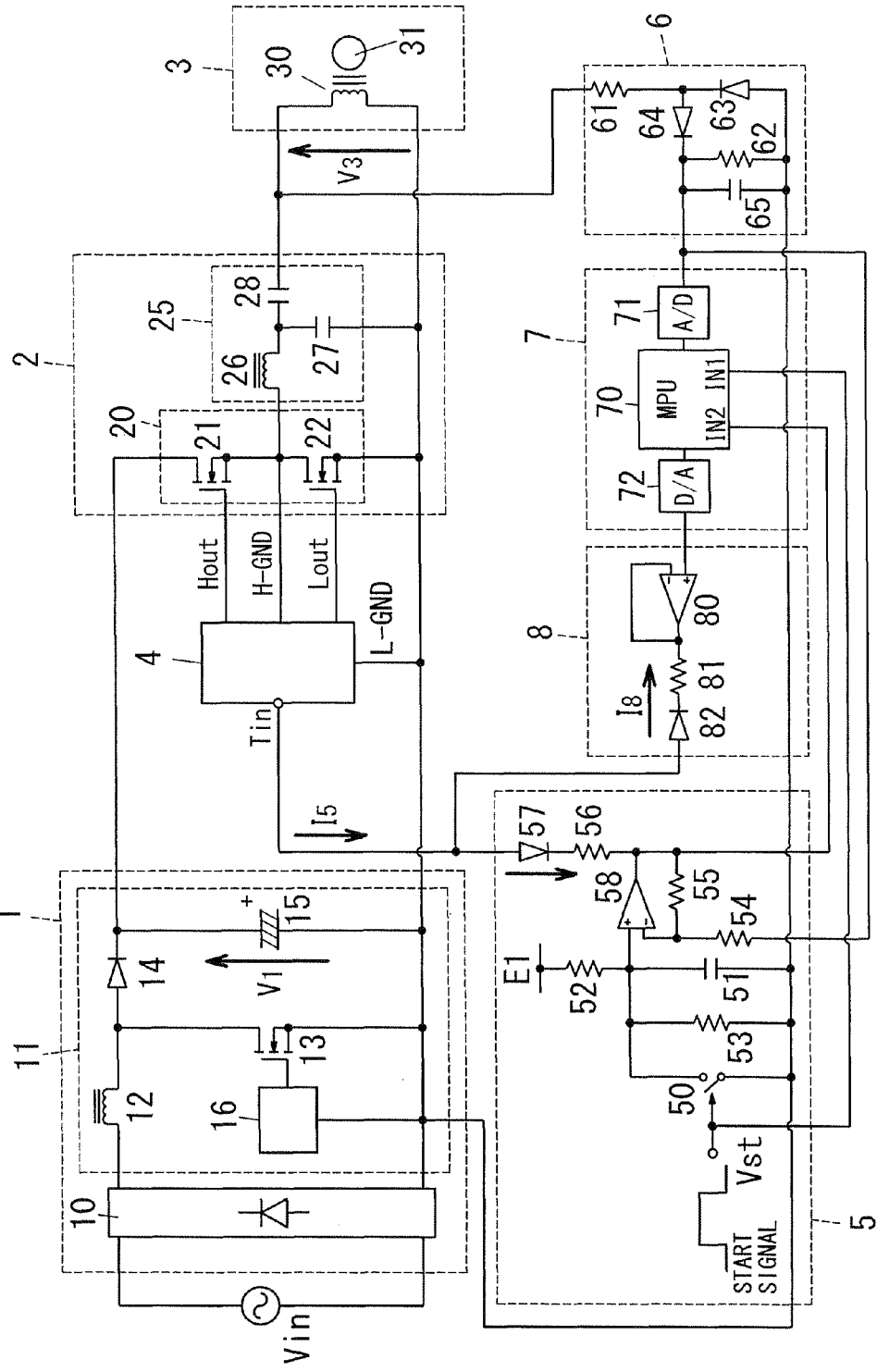
FIG. 15 is a schematic diagram of an electronic ballast for a discharge lamp, in accordance with a sixth embodiment of the present invention.

FIG. 15 is a schematic diagram of an electronic ballast for a discharge lamp, in accordance with a sixth embodiment of the present invention. The ballast in the sixth embodiment is formed in almost the same way as any of the first to fifth embodiments. For the purpose of clarity, like kind elements are assigned the same reference numerals as depicted in the first embodiment.

In an aspect of the sixth embodiment, a first end of a resistor 54 is connected to a negative terminal of an operational amplifier 58 like the first embodiment, but a second end of the resistor 54 is connected to the output of a detection circuit 6. Thereby, a frequency control circuit 5 supplies a drive circuit 4 with a control signal for adjusting the operation frequency of an inverter circuit 20 so that load voltage becomes equal to target voltage by feedback control of the load voltage. The target voltage is load voltage corresponding to the end frequency of sweep of the inverter circuit's operation frequency. Even if a resonant curve in the start mode is steep, the load voltage is gradually increased and accordingly the start operation can be stabilized.

Seventh Embodiment

Figure 16:
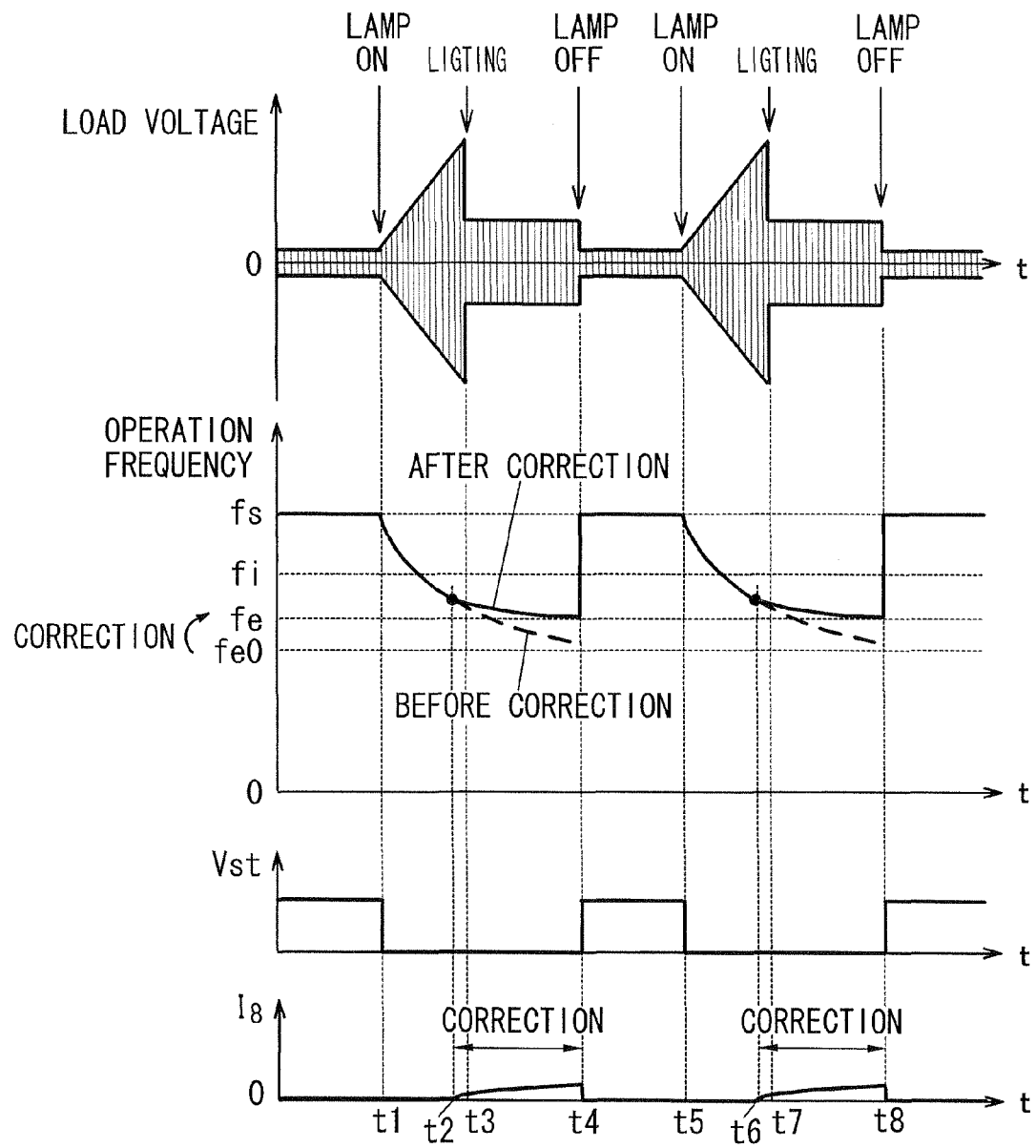
FIG. 16 is an explanatory diagram of operation of an electronic ballast for a discharge lamp, in accordance with a seventh embodiment of the present invention.

FIG. 16 is an explanatory diagram of operation of an electronic ballast for a discharge lamp, in accordance with a seventh embodiment of the present invention. The ballast in the seventh embodiment is formed in almost the same way as any of the first to sixth embodiments. For the purpose of clarity, like kind elements are assigned the same reference numerals as depicted in the first embodiment.

A frequency control circuit 5 in the seventh embodiment is configured to periodically turn the discharge lamp on and off by periodically sweeping the operation frequency of the inverter circuit 20 from a start frequency fs to an end frequency fe in accordance with a dimming signal Vst. The period of the dimming signal Vst is set to equal to or higher than about 100 Hz so that a flicker feel with respect to human eyes is suppressed.

Figure 17:
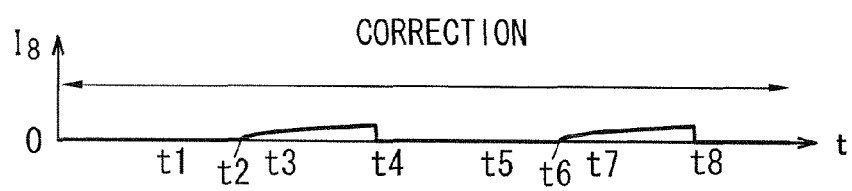
FIG. 17 illustrates an alternate example of prediction operation.

In an example, as shown in FIG. 17, an MPU 70 of a predictive circuit 7 holds the first predicted resonance frequency obtained in response to the dimming signal till the end of the dimming signal. A correction circuit 8 includes a diode 82, and accordingly the correction circuit 8 operates like FIG. 16 even if the first predicted resonance frequency is held. That is, the correction circuit 8 substantially works only when the voltage of a terminal Tin is equal to or higher than correction voltage.

Figure 4:
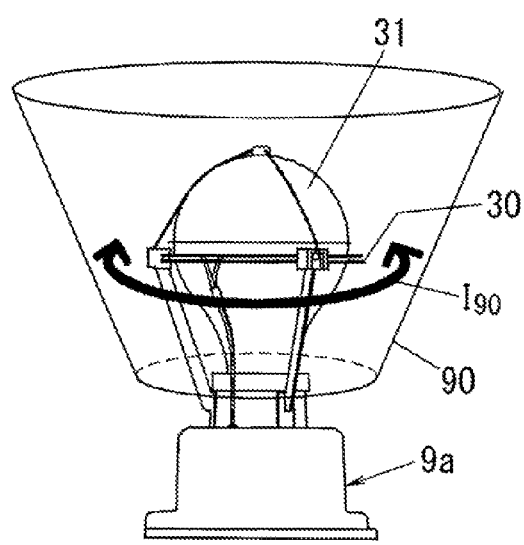
FIG. 4 is an explanatory diagram of the issue.
Figure 18:
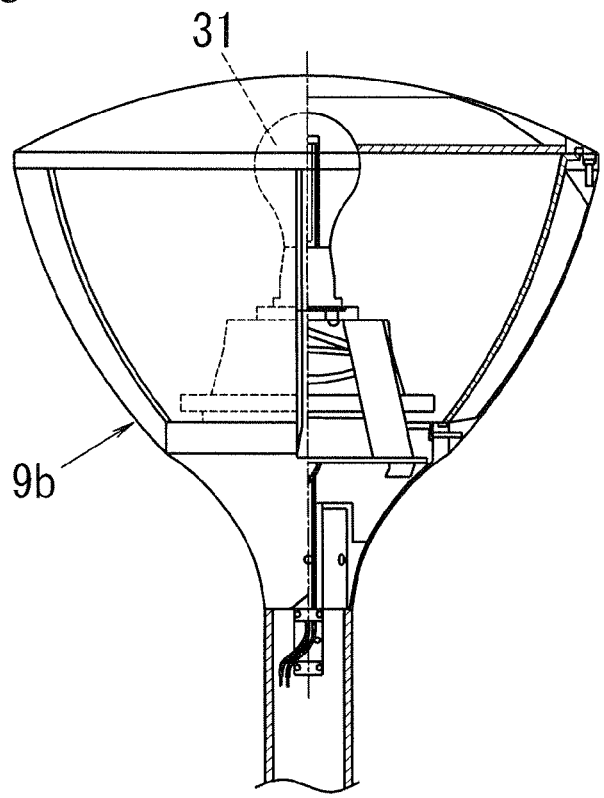
FIG. 18 illustrates luminaire.
Figure 19:
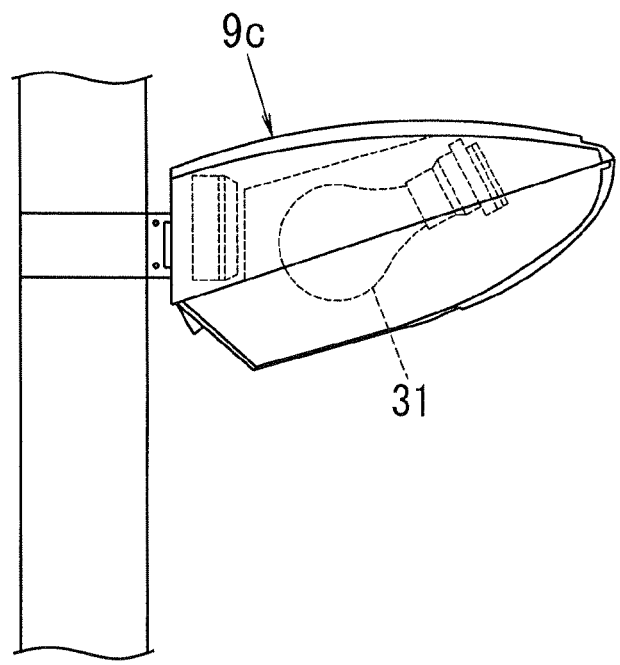
FIG. 19 illustrates luminaire.

In luminaire in accordance with an embodiment of the present invention, an electronic ballast for a discharge lamp in any of the first to seventh embodiments is incorporated in luminaire such as a down light 9a as shown in FIG. 4, a street lamp 9b shown in FIG. 18, a security lamp 9c shown in FIG. 19, or the like.

Although the present invention has been described with reference to certain preferred embodiments, numerous modifications and variations can be made by those skilled in the art without departing from the true spirit and scope of this invention.

The invention claimed is:

1. An electronic ballast for a discharge lamp, comprising:
a power conversion circuit including an inverter circuit and a resonant circuit, the power conversion circuit being configured to convert DC voltage from a DC power supply circuit into AC voltage with the inverter circuit to apply the AC voltage across a load circuit including at least the discharge lamp via the resonant circuit;
a drive circuit configured to adjust an operating frequency of the inverter circuit in accordance with a control signal; and
a frequency control circuit configured to supply the control signal to the drive circuit to sweep the operating frequency of the inverter circuit from a start frequency to an end frequency and thereby to increase load voltage that is the AC voltage applied across the load circuit,
wherein the electronic ballast further comprises:
a predictive circuit configured to predict a resonance frequency of the combination of the resonant circuit and the load circuit after ignition of the discharge lamp, the resonance frequency being predicted based on an input signal representing the load voltage in the period of time from the start of sweep of the operating frequency through a time point immediately after ignition of the discharge lamp; and
a correction circuit configured to change said end frequency to the resonance frequency.

2. The electronic ballast of claim 1, wherein the predictive circuit is configured:
(A) to use collinear or curve approximation for each combination of input signals representing the load voltage in the said period of time and operation frequencies of the inverter circuit corresponding to the input signals; and
(B) to obtain the resonance frequency of said combination from a frequency corresponding to an intersection point of the straight or curve line with substantially maximum AC voltage of the power conversion circuit;
wherein the operation frequency of the inverter circuit is obtained from the control signal.

3. The electronic ballast of claim 1, wherein the predictive circuit is configured to calculate an actual change rate to obtain the resonance frequency of said combination from the resonance frequency having the same correlation as a specified correlation with the actual change rate,
the actual change rate being a change rate of input signals representing the load voltage obtained at the start and the end of a specified period of time,
the specified correlation being a correlation between a change rate of input signals representing the load voltage previously obtained at the start and the end of a specified period of time and a previously obtained resonance frequency of said combination,
the specified period of time being a period of time from the start of sweep of the operation frequency through a point in time before ignition of the discharge lamp.

4. The electronic ballast of claim 1, wherein the predictive circuit is configured to receive an input signal representing the load voltage at the start of sweep of the operation frequency to obtain the resonance frequency of said combination from the resonance frequency having the same correlation as a specified correlation with the input signal,
the specified correlation being a correlation between an input signal representing the load voltage previously obtained at the start of sweep of the operation frequency and a previously obtained resonance frequency of said combination.

5. The electronic ballast of claim 1, wherein the predictive circuit is configured:
   (a) to drive an operation frequency of the inverter circuit, corresponding to an input signal representing the load voltage equal to specified voltage, from the control signal; and
   (b) to obtain the resonance frequency of said combination from the resonance frequency having the same correlation as a specified correlation with the operation frequency;
   wherein the specified correlation is a correlation between an operation frequency of the inverter circuit, corresponding to an input signal representing the load voltage equal to the specified voltage, previously derived from the control signal and a previously obtained resonance frequency of said combination.

6. The electronic ballast of claim 1, wherein the predictive circuit is configured:
   (i) to drive an operation frequency of the inverter circuit, corresponding to an input signal representing the load voltage at a time point immediately after ignition of the discharge lamp, from the control signal; and
   (ii) to obtain the resonance frequency of said combination from the resonance frequency having the same correlation as a specified correlation with the operation frequency;
   wherein the specified correlation is a correlation between an operation frequency of the inverter circuit, corresponding to an input signal representing the load voltage at a time point immediately after ignition of the discharge lamp, previously derived from the control signal, and a previously obtained resonance frequency of said combination.

7. The electronic ballast of any one of claims 1-6, wherein the frequency control circuit supplies the drive circuit with the control signal for adjusting the operation frequency of the inverter circuit so that the load voltage becomes equal to target voltage by feedback control of the load voltage.

8. The electronic ballast of any one of claims 1-6, wherein the frequency control circuit is configured to periodically sweep the operation frequency of the inverter circuit from the start frequency to the end frequency and thereby to periodically turn the discharge lamp on and off, in accordance with a dimming signal.

9. The electronic ballast of any one of claims 1-6, wherein the load circuit comprises an induction coil connected with the output of the power conversion circuit, and an electrodeless discharge lamp in the proximity of the induction coil.

10. Luminaire comprising the electronic ballast of any one of claims 1-6.

* * * * *

UNITED STATES PATENT AND TRADEMARK OFFICE
CERTIFICATE OF CORRECTION

| | |
|---|---|
| PATENT NO. | : 8,179,057 B2 |
| APPLICATION NO. | : 12/669538 |
| DATED | : May 15, 2012 |
| INVENTOR(S) | : Makimura et al. |

Page 1 of 1

It is certified that error appears in the above-identified patent and that said Letters Patent is hereby corrected as shown below:

In the Specifications

Column 3, line 32 and 45, for the word "drive", each occurrence, should be changed to --derive--.

Column 10, lines 14 and 51, for the word "drives", each occurrence, should be changed to --derives--.

In the Claims

Column 13, Claim 5, line 6, for the word "drive" should be changed to --derive--.

Column 13, Claim 6, line 21, for the word "drive" should be changed to --derive--.

Signed and Sealed this
Eighteenth Day of March, 2014

Michelle K. Lee
*Deputy Director of the United States Patent and Trademark Office*